A. J. MARKEL.
GATE HINGE.
APPLICATION FILED FEB. 21, 1920.
1,362,634.
Patented Dec. 21, 1920.
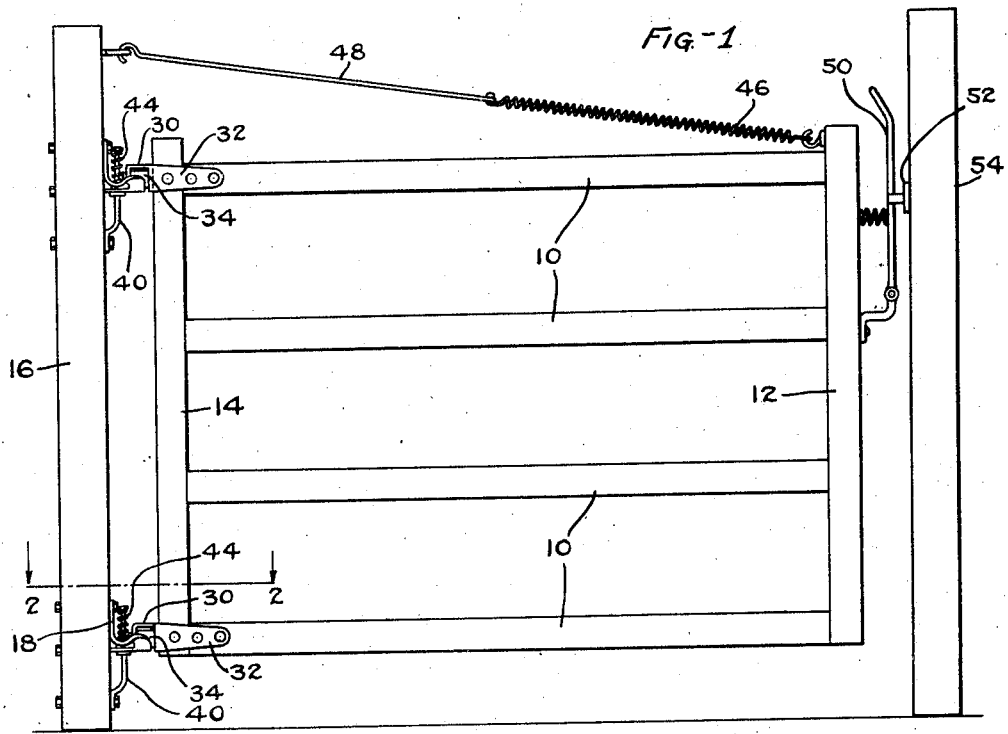
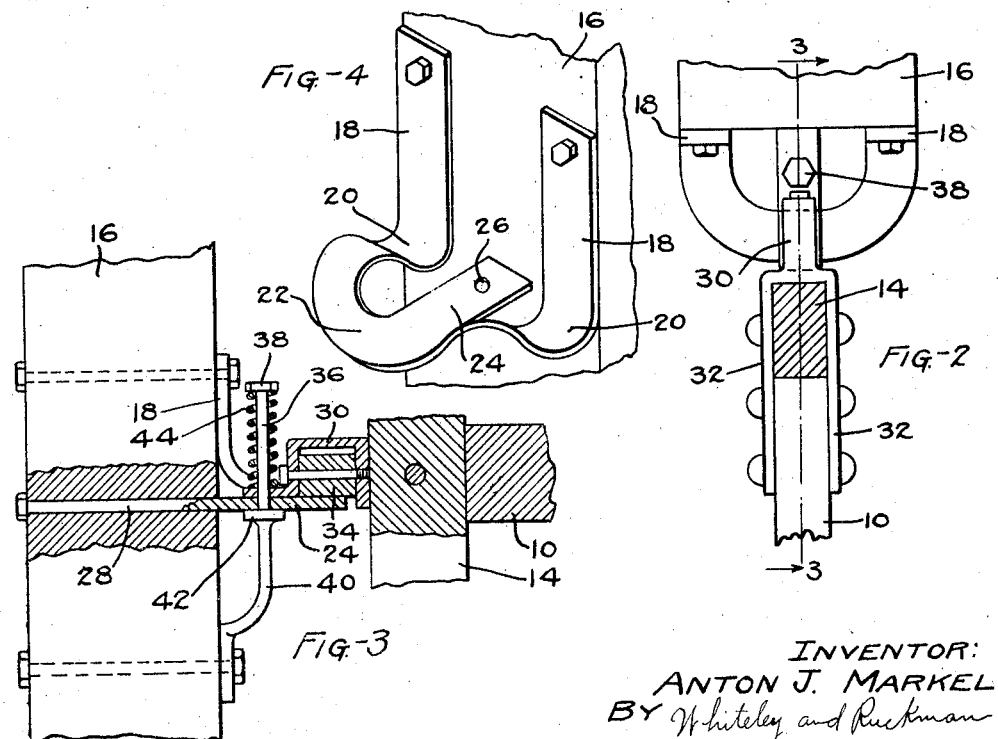
INVENTOR:
ANTON J. MARKEL.
BY Whiteley and Ruckman
ATTORNEYS.

UNITED STATES PATENT OFFICE.

ANTON J. MARKEL, OF FORT CLARK, NORTH DAKOTA.

GATE-HINGE.

1,362,634.    Specification of Letters Patent.    Patented Dec. 21, 1920.

Application filed February 21, 1920. Serial No. 360,520.

*To all whom it may concern:*

Be it known that I, ANTON J. MARKEL, a citizen of the United States, residing at Fort Clark, in the county of Oliver and State of North Dakota, have invented certain new and useful Improvements in Gate-Hinges, of which the following is a specification.

My invention relates to gate hinges and an object is to provide an improved construction of hinges for attaching gates and similar structures. An object in particular is to provide a hinge which will hold the gate in open position when swung open in either direction and which will cause the gate to close when it is pushed a short distance toward its closed position.

The full objects and advantages of my invention will appear in connection with the detailed description thereof and the novel features embodied in my inventive idea will be particularly pointed out in the claim.

In the accompanying drawings,—

Figure 1 is a side elevational view of a gate which is mounted by the use of my hinge. Fig. 2 is a view in section on the line 2—2 of Fig. 1. Fig. 3 is a view in section on the line 3—3 of Fig. 2. Fig. 4 is a perspective view of the track member of my hinge.

In the drawings I have shown two of my hinges used in connection with a gate having bars 10 secured to a front vertical member 12 and a rear vertical member 14, the gate being hinged to a post 16. Both hinges are the same in construction and hence the same reference characters will be used in connection therewith. The hinge consists of a track member which is secured to the post 16 and a coöperating roller-carrying member which is secured to the gate. The track member, as best shown in Fig. 4, is formed from a piece of metal and has arms 18 which are bolted to the post 16, the portion between the arms forming a runway which has depressions 20 adjacent the post and a depression 22 at the center of the runway and farther from the post. An extension 24 provided with a hole 26 extends rearwardly from the center of the track member and is formed into a bolt 28 for passing through the post. The roller-carrying member consists of an angular portion 30 from which extend straps 32 which are bolted to the gate. A roller 34 is journaled in the angular portion 30 and this roller is adapted to ride upon the runway of the track member. A hinge pintle 36 is provided at its upper end with a nut 38 and the lower end of the pintle is provided with a curved bracing portion 40 which is secured to the post 16. The pintle extends through the hole 26 and through a hole in the rear of the angle member 30, a shoulder 42 being provided upon which the extension 24 is supported. The angle member 30 is thus slidably and rotatably mounted upon the pintle. A coiled spring 44 surrounds the pintle between the nut 38 and the rear of the angle member 30 and thus holds the roller 34 down into engagement with the track member. The gate may be additionally supported by a coiled spring 46 attached to the top front portion thereof and connected by a rod 48 with the post 16. The gate is preferably provided with a spring-pressed latch 50 for engagement with a catch 52 secured to a post 54 whereby the gate is securely held in closed position.

The operation and advantages of my invention will be obvious from the foregoing description. When the gate is swung open in either direction the roller 34 rides up the inclined portion of the track, thereby compressing the spring 44; and when the gate is fully open the roller drops into one of the depressions 20 with the result that the gate is held with sufficient force, due to the spring 44, so that it will not be swung closed by the wind. When it is desired to close the gate it is only necessary to push it sufficiently to bring the roller over the high portion of the track, whereupon the force exerted by the spring 44, which at that time is under compression, will cause the gate to move to its closed position with sufficient momentum to bring the latch 50 into engagement with the catch 52. The action of the spring 44 will serve to hold the gate in closed position even if the latch device is not employed.

I claim:

A gate hinge comprising a track member having vertical arms adapted to be secured to a hinge post, the central portion of said track member extending forwardly and constituting a runway having depressed portions adjacent said arms and having a centrally depressed portion, a horizontal member extending rearwardly from the central portion of said track member for passing through a horizontal hole in the post, a coöperating member adapted to be secured to the gate, a roller mounted on the said coöperating member and adapted to roll on said trackway, a pintle adapted to be secured to the post so as to extend upwardly in spaced relation relatively thereto, said pintle extending through a hole in an offset portion of said coöperating member and through a hole in said rearwardly extending member and the latter resting upon a shoulder on said pintle, and a spring surrounding said pintle between the enlarged upper end thereof and said offset portion of the coöperating member.

In testimony whereof I hereunto affix my signature.

ANTON J. MARKEL.